US010120429B2

(12) United States Patent
Sander et al.

(10) Patent No.: US 10,120,429 B2
(45) Date of Patent: Nov. 6, 2018

(54) CURRENT CONTROL CIRCUIT AND A METHOD THEREFOR

(71) Applicant: TELEFONAKTIEBOLAGET LM ERICSSON (PUBL), Stockholm (SE)

(72) Inventors: Sverker Sander, Billdal (SE); Kjell-Arne Remnås, Hindås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 79 days.

(21) Appl. No.: 15/303,244

(22) PCT Filed: Apr. 11, 2014

(86) PCT No.: PCT/EP2014/057347
§ 371 (c)(1),
(2) Date: Oct. 11, 2016

(87) PCT Pub. No.: WO2015/154817
PCT Pub. Date: Oct. 15, 2015

(65) Prior Publication Data
US 2017/0031407 A1 Feb. 2, 2017

(51) Int. Cl.
*H02H 9/02* (2006.01)
*G06F 13/40* (2006.01)
(Continued)

(52) U.S. Cl.
CPC ............. *G06F 1/28* (2013.01); *H02H 9/004* (2013.01); *H02M 1/08* (2013.01); *H02M 1/36* (2013.01);
(Continued)

(58) Field of Classification Search
CPC ... H02H 9/004; G06F 13/385; G06F 13/4022; G06F 13/409; G06F 13/4282; G06F 13/4081
See application file for complete search history.

(56) References Cited

U.S. PATENT DOCUMENTS 5,758,102 A * 5/1998 Carey ................. G06F 13/4081
710/302
5,764,926 A * 6/1998 Fukuda .................. H02H 9/004
323/908
(Continued)

OTHER PUBLICATIONS

International Search Report and Written Opinion issued in International application No. PCT/EP2014/057347, dated Jan. 5, 2015, 11 pages.
(Continued)

*Primary Examiner* — Glenn A. Auve
(74) *Attorney, Agent, or Firm* — Rothwell, Figg, Ernst & Manbeck, p.c.

(57) ABSTRACT

A method and a current control circuit 100 therefor. The method for a current control circuit 100 comprising determining 201 a state of the current control circuit 100, select 202 a first mode of operation 203 if the determined state is a first state indicative of a hot plug-in of the input terminal 101 to a connectable DC voltage bus. The method further comprises selecting 202 a second mode of operation 204 if the determined state is a second state different from the first state. The method further comprises controlling 205 the output current using the selected mode of operation.

20 Claims, 3 Drawing Sheets

(51) Int. Cl.
    *G06F 1/28*     (2006.01)
    *H02M 1/36*     (2007.01)
    *H02M 3/155*     (2006.01)
    *H02H 9/00*     (2006.01)
    *H02M 1/08*     (2006.01)
    *H02M 3/156*     (2006.01)
    *H02M 1/00*     (2006.01)

(52) U.S. Cl.
    CPC ........... *H02M 3/155* (2013.01); *H02M 3/156* (2013.01); *H02M 2001/0009* (2013.01); *H02M 2001/0045* (2013.01)

(56) References Cited

U.S. PATENT DOCUMENTS

| | | | |
|---|---|---|---|
| 5,774,315 A * | 6/1998 | Mussenden | H02H 9/004 307/86 |
| 5,886,431 A * | 3/1999 | Rutigliano | H02H 9/001 307/131 |
| 6,353,523 B1 * | 3/2002 | Niv | H02H 9/004 361/58 |
| 6,841,979 B2 | 1/2005 | Berson et al. | |
| 8,159,801 B2 | 4/2012 | Fasth et al. | |
| 2005/0072987 A1 | 4/2005 | Robb et al. | |
| 2007/0069703 A1 | 3/2007 | Kokubun et al. | |
| 2008/0310198 A1 | 12/2008 | Chiang et al. | |
| 2010/0026260 A1 | 2/2010 | Xu | |
| 2011/0019316 A1 * | 1/2011 | Zhan | H02M 1/32 361/18 |
| 2017/0177515 A1 * | 6/2017 | Yoon | G06F 12/0875 |

OTHER PUBLICATIONS

Texas Instruments, "-48-V Hot Swap Power Manager, TPS2394" Aug. 2010, 20 pages.

* cited by examiner

CURRENT CONTROL CIRCUIT AND A METHOD THEREFOR

CROSS-REFERENCE TO RELATED APPLICATION(S)

This application is a 35 U.S.C. § 371 National Phase Entry Application from PCT/EP2014/057347, filed Apr. 11, 2014, and designating the United States.

TECHNICAL FIELD

The present invention relates to a current control circuit and a method therefor. In particular the present invention relates to a current control circuit and a method for controlling the current during hot-swap and power line disturbances.

BACKGROUND

In complex electronic systems of today intelligent power management is crucial for the function of the system. More and more switched mode power supplies are used with different supply voltages. In order to provide 100% uptime of the electronic system hot-swapping of circuits are necessary. If a circuit with high in-capacitance is hot-swapped a large inrush current might occur, if the capacitors of the circuit are discharged. This large inrush current might cause fluctuations of the power supply voltages. This phenomenon is commonly designated 'sags'.

Another problem involves power line disturbances (PLD) that can involve large voltage spikes on the supply means caused by for example inductive load switching. This phenomenon is commonly designated 'surges'.

The same equipment that causes sags when turned on can often cause surges when turned off.

These disturbances can have a detrimental effect on computers, memory circuits and radio communication equipment as well as other types of electronic circuits. It is therefore a large need to mitigate the effects due to these disturbances.

There exists a vast array of methods for mitigating the effects of PLD and hot-swapping. Among the most popular methods are the linear mode of control and the switched mode of control of over currents.

The linear mode of control is used in several integrated hot-swap power managers, such as the TPS2394 from Texas Instrument. This circuit utilizes a power FET to provide load current slew rate control and peak current limiting.

However, the linear mode of control involves high power dissipation during a short time interval in the power FET, if the disturbance is large. Hence, large and expensive power FET's are needed in order to stay within stated safe operating area (SOA).

The other popular method is the switch mode of control; this method is disclosed in for example U.S. Pat. No. 6,841,979. This disclosure describes the use of a pulse width modulator to control the current, thus decreasing transistor power losses.

A disadvantage associated with the use of switch mode control of the current is the large amount of conducted or radiated noise that is generated by the switching.

Therefore, a large need for an improved current control circuit that obviates the need for large power FET and reduces the amount of generated noise exists.

SUMMARY

It is an object of exemplary embodiments of the invention to address at least some of the issues outlined above. This object and others are achieved by the method and the device according to the appended independent claims, and by the embodiments according to the dependent claims.

A first exemplary embodiment provides a current control circuit comprising an input terminal configured to be connected to a DC voltage bus, an output terminal, a detection means configured to detect a parameter of the current control circuit. The current control circuit further comprises a switching means connected to the input terminal via a current detection means, and to the output terminal via a output circuit, the switching means is configured to provide a controllable resistance. The current control circuit further comprises a processing means connected to the current detection means for receiving a first signal indicative of a current flowing from the input terminal to the output terminal. The processing means is further connected to the detection means, and configured to determine a state of the current control circuit. The processing means is configured to select a first mode of operation if the determined state is a first state indicative of a hot plug-in of the input terminal to the connectable DC voltage bus. The processing means is further configured to select a second mode of operation if the determined state is a second state different from the first state, and the processing means is further configured to control the switching means using the selected mode of operation.

A second exemplary embodiment provides a method for a current control circuit comprising determining a state of the current control circuit, selecting a first mode of operation if the determined state is a first state indicative of a hot plug-in of a connectable load. The method further comprises selecting a second mode of operation if the determined state is a second state different from the first state, and controlling the output current using the selected mode of operation.

An advantage of exemplary embodiments is that an improved circuit and method are provided.

An advantage of certain embodiments is that the maximum power dissipation of the power FET can be reduced.

An advantage of certain embodiments is that the amount of generated noise can be reduced.

BRIEF DESCRIPTION OF THE DRAWINGS

In the following description of embodiments of the invention, reference will be made to the accompanying drawings of which.

DETAILED DESCRIPTION

Figure 1:
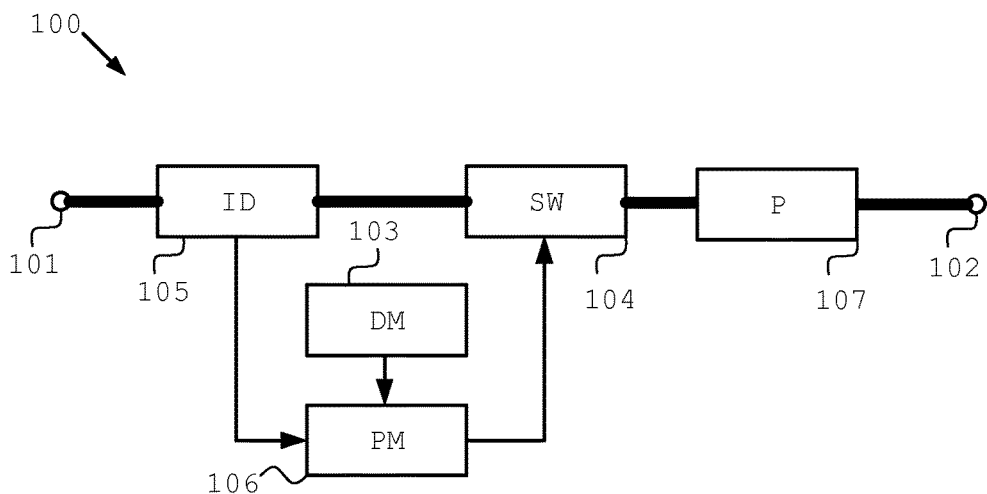
FIG. 1 is a schematic block diagram of an embodiment of a current control circuit.

The present invention will now be described more fully hereinafter with reference made to the accompanying drawings, in which preferred embodiments of the invention are shown. This invention may, however be embodied in many different forms and should not be construed as limited to the embodiments set forth herein; rather, these embodiments are provided so that this disclosure will be thorough and complete, and fully convey the scope of the invention to those skilled in the art. In the drawings, like reference signs refer to like elements.

Moreover, it is apparent that the exemplary methods and devices described below may be implemented, at least partly, by the use of software functioning in conjunction with a programmed microprocessor or general purpose computer, and/or using an application specific integrated circuit (ASIC). Further, while the embodiments of the invention are primarily described in the form of methods and devices, the embodiments may also, at least partly, be implemented as a computer program product or in a system comprising a computer processor and a memory coupled to the processor, wherein the memory is encoded with one or more programs that may perform the functions disclosed herein.

FIG. 1 is a schematic block diagram of a current control circuit, generally designated 100. The current control circuit 100 comprises an input terminal 101 adapted to receive input power from a connectable DC-voltage bus. The input terminal 101 is connected to a switching means 104 via a current detection means 105. The switching means 104 is further connected to an output terminal 102 via a passive circuit 107. The output terminal 102 is adapted to supply a connectable load with power from the connectable DC-voltage bus.

The switching means 104 is configured to provide a controllable resistance between the input terminal 101 and the output terminal 102 such that the current flowing there between can be controlled.

The switching means 104 may in one embodiment comprise a power FET.

The current control circuit 100 further comprises a processing means 106 connected to the current detection means 105 for receiving a first signal indicative of a current flowing from the input terminal 101 to the output terminal 102.

The processing means 106 is further connected to the detection means 103, and configured to determine a state of the current control circuit 100 based on information from the detection means 103.

The processing means 106 is further configured to select a first mode of operation if the determined state is a first state indicative of a hot plug-in of the input terminal 101 to the connectable DC voltage bus.

The processing means 106 is further configured to select a second mode of operation if the determined state is a second state different from the first state, and the processing means 106 is further configured to control the switching means 104 using the selected mode of operation.

The detection means 103 may in one embodiment be a voltage detection means configured to detect a voltage parameter at the output terminal 102, wherein the voltage parameter at the output terminal can be used to determine the state of the current control circuit 100. The processing means 106 is configured to select the first mode when the output voltage is below a first predetermined threshold voltage.

The detection means 103 may in one embodiment be a voltage detection means configured to detect a voltage parameter at the input terminal 101, wherein the voltage parameter at the input terminal can be used to determine the state of the current control circuit 100. The processing means 106 is configured to select the first mode when the input voltage is below a second predetermined threshold voltage.

The detection means 103 may in one embodiment be a temperature detection means configured to detect the temperature of the switching element 104, and the first mode is selected when the detected temperature is below a first predetermined threshold temperature. In one embodiment a temperature of the output circuit 107 may be detected by the detection means.

The detection means 103 may in one embodiment be a timer configured to detect the lapsed time from a start of the current control circuit 100, and the first mode is selected when the detected lapsed time is shorter than a first predetermined time.

In one embodiment, the first mode of operation comprises linear control of the switching means 104. The linear control of the switching means involves gradually increasing/decreasing the resistance of the switching means 104. In one embodiment the switching means comprises a power FET, the gradual control of the resistance can be provided by means of adjusting the gate voltage of the power FET. However, the linear mode of control usually involves a large amount of power dissipation during a short time interval in the switching means, if large deviations from the nominal input voltage occur. The heat dissipation in the switching means is especially troublesome if a power FET is used as a switching means, because the power FET needs to be dimensioned according its safe operating area diagram, causing the power FET to become unnecessary large, which increases the cost and effective board area.

Therefore, in order to handle large deviations from normal operating range voltage the second mode of operation comprises switch mode control of the switching means 104. By using switch mode of control, the switching means changes its state between an 'on' state with low resistance and an 'off' state with high resistance.

The second mode of operation may in one embodiment comprise controlling the switching means 104 by means of a waveform from a group of piece-wise linear, saw-tooth, sinusoidal or spline. These different waveforms can easily be generated by means of the processing means 106, if the processing means comprises a digital analogue to digital converter (ADC).

In one embodiment comprises the switching means 104 a transistor.

In one embodiment, the current detection means 105 is a resistor and the processing means 106 comprises means for measuring the voltage drop over said resistor. The voltage drop over the resistor is proportional to the current flowing between the input terminal 101 and the output terminal 102. The current detection means 105 may in one embodiment comprise a differential amplifier that can be arranged to measure the differential voltage over the resistor. The output from the differential amplifier is relayed to the processing means.

In one embodiment the processing means 106 comprise a processor and a memory and wherein said memory is containing instructions executable by said processor.

In another embodiment, the processing means comprises a programmable circuit such as a field programmable gate array.

Figure 3:
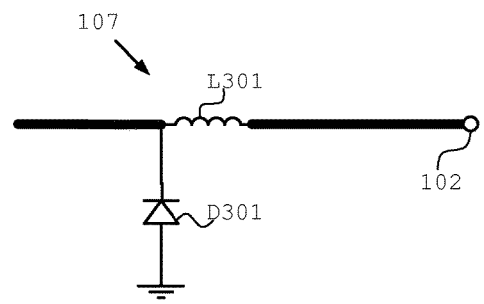
FIG. 3 is a circuit diagram of an embodiment of a output circuit.

The switch mode of operation requires an output circuit 107 comprising an element that supplies high impedance when the switching means briefly is turned on. As illustrated in FIG. 3 one embodiment of the output circuit 107 comprises an inductor L301 arranged in series with the output terminal 102 and a diode D301 connected between an input of the output circuit 107 and ground.

The diode D301 is configured to act as a freewheeling diode configured to protect the switching means during turning 'off', otherwise large inductive currents might destroy the switching means.

Figure 2:
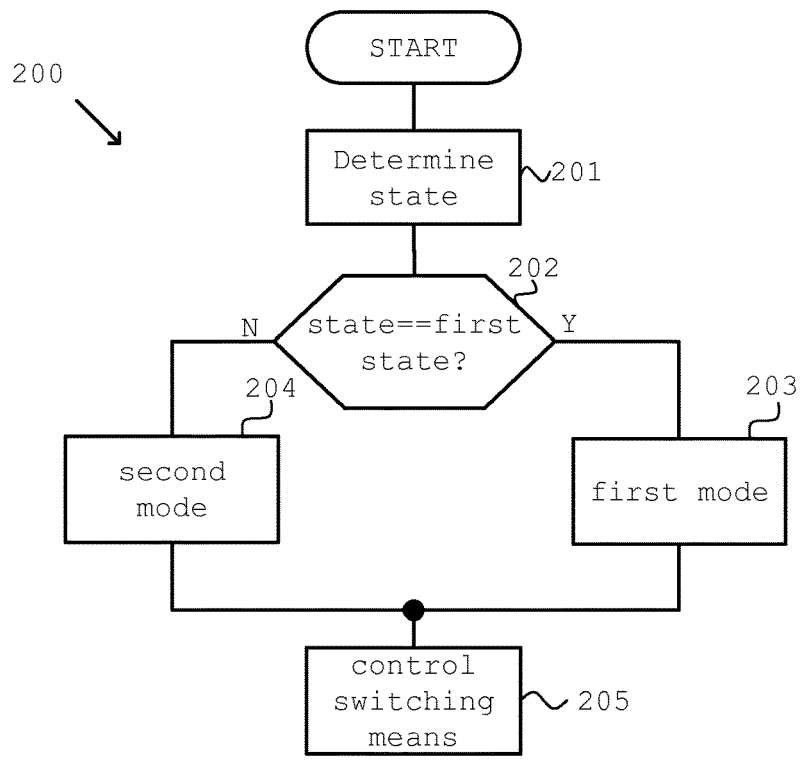
FIG. 2 is flow diagram illustrating an embodiment of a method for a current control circuit.

In FIG. 2 a flowchart illustrating an embodiment of a method for the current control circuit 100 are disclosed. The method comprising:

201: Determining a state of the current control circuit 100. This determining may be performed by the processing means 106 using information from the detection means 103.

202: Selecting a first mode of operation 203 if the determined state is a first state indicative of a hot plug-in of a connectable load. In one embodiment, the first state involves linear control of the switching means 104. This linear control involves gradually decreasing/increasing the resistance of the switching means 104.

202: Selecting a second mode of operation 204 if the determined state is a second state different from the first state. In one embodiment, the second state is indicative of a power line disturbance (PLD), wherein the second mode of operation 204 involves switch mode control of the switching means.

205: Controlling the output current using the selected mode of operation.

In one embodiment the step of determining 201 involves measuring the output voltage at the output terminal 102, and the state is determined to be the first state if the output voltage is below a first predetermined threshold voltage.

If the measured output voltage at the output terminal is below the first predetermined threshold voltage the linear control of the switching means is the preferred mode of operation, due to the small amount of noise generated by this mode.

In one embodiment, the step of determining 201 involves measuring the temperature of the switching element 104, and the state is determined to be the first state if the measured temperature is below a first predetermined threshold temperature.

Thus, if the measured temperature of the switching element 104 is below the first predetermined threshold temperature it is determined that the current control circuit is in the first state.

In one embodiment, the step of determining 201 involves measuring the lapsed time from starting the current control circuit 100, and the state is determined to be the first state if the measured time is shorter than a first predetermined time.

In one embodiment, the first mode of operation comprises linear control of the output current by means of the switching means 104. The linear control of the output current may be controlled by gradually adjusting the resistance of the switching means 104. The switching means 104 may comprise a power FET or another type of power transistor.

In one embodiment, the second mode of operation comprises switch mode control of the output current by means of controlling the switching means 104.

The switch mode control comprises control of the switching means such that the switching means turns on/off in a pulsed manner with a duty cycle commanded by the processing means. The duty cycle of the pulses controls the current flowing from the input terminal 101 to the output terminal 102. The switch mode of operation requires a output circuit 107 that supplies supplies high impedance when the switching means briefly is turned on. In FIG. 3 an embodiment of a output circuit 107 is disclosed. This output circuit most commonly comprises an inductor L301 in series with the input terminal of the output circuit and the output terminal 102. In order to protect the switching means from harmful currents a free wheel diode D301 is provided between the input of the output circuit 107 and ground.

Figure 4:
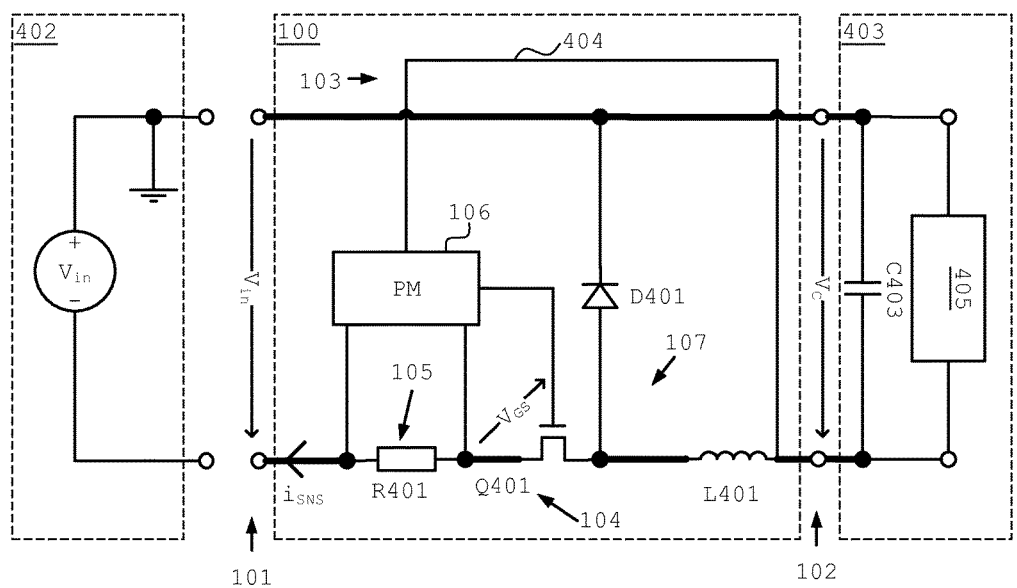
FIG. 4 is a schematic circuit diagram illustrating an embodiment of a current control circuit.

In order to fully appreciate the beneficial features of the disclosed current control circuit 100 an exemplary scenario will now be disclosed with reference made to FIG. 4.

In this figure a DC-voltage bus (DC-bus) with positive ground, generally designated 402, is disclosed. This type of DC-bus is widely used within the telecommunication industry for supplying different types of equipment with power. Due to the demands in term of uptime failing circuits must be replaced without shutting down the DC-voltage bus i.e. hot-swapping.

The current control circuit 100 in FIG. 4 comprises a processing means 106 arranged to control a FET Q401 by means of the gate voltage. Thus, the FET Q401 is the switching means in this embodiment. The current control circuit 100 further comprises a shunt resistor R401 arranged to sense the current flowing from the input terminal to the output terminal. The voltage drop over the resistor R401 is proportional to the current $i_{SNS}$ and measured by the processing means 106.

The current control circuit 100 further comprises a output circuit 107 comprising an inductor L401 arranged between the FET Q401 and the output terminal 102. The output circuit further comprises a freewheel diode D401 providing a current path to ground potential for inductive currents during turn off of the FET Q401.

The processing means 106 further is connected to a detection means 103 that in this embodiment is a wire 404 connected to the output terminal 102 for detecting the output voltage.

The output terminal 102 of the current control circuit 100 is connected to a load 403 that comprises a capacitor C403 and a circuit 405 that is supplied with power from the DC-bus upon connection of the input terminal 101 to the DC-bus 402.

The function of the circuit illustrated in FIG. 4 will in the following be described with reference made to FIG. 5.

Initially, the current control circuit 100 and the load 403 are disconnected from the DC-bus 402. The capacitor C403 of the load 403 is fully discharged.

Figure 5:
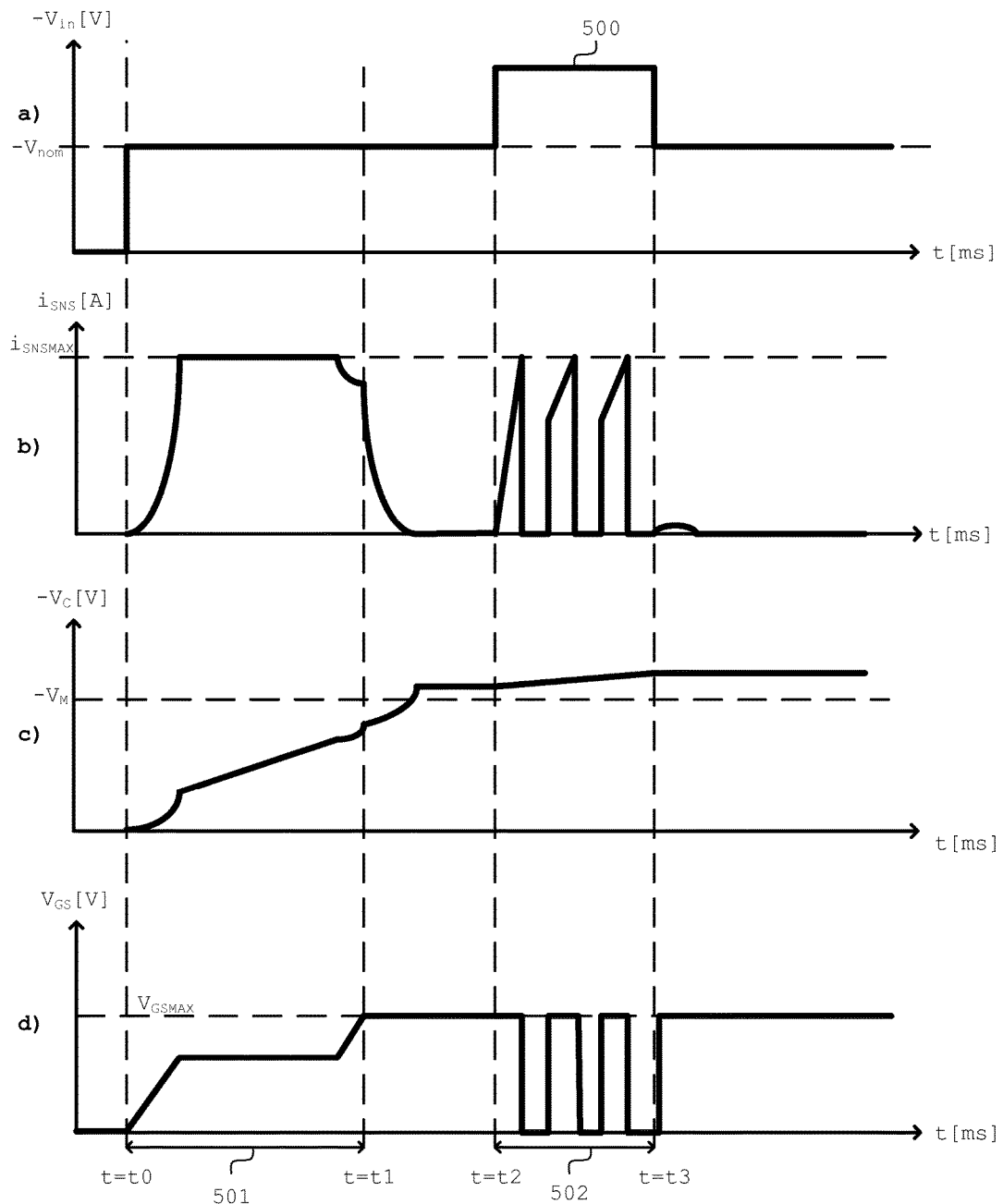
FIG. 5 is a graph illustrating the function of one embodiment of the current control circuit.

The different graphs a)-d) of FIG. 5 are described below:

FIG. 5 a) discloses the input voltage ($V_{in}$) at the input terminal 101 versus time.

FIG. 5 b) discloses the current ($i_{SNS}$) flowing through the current detection means 105 versus time.

FIG. 5 c) discloses the voltage over the capacitor C403 ($V_C$) versus time.

FIG. 5 d) discloses the gate voltage of the FET Q403 versus time.

The function of the current control circuit 100 will now be described in a chronological order starting from t=0 in the graphs a)-d) of FIG. 5.

t=t0: The current control circuit 100 and the load 403 are connected to the DC-bus 402. The processing means senses the voltage ($V_C$) over the capacitor C403, and since this voltage is below the first predetermined threshold ($V_M$) a first state indicating a hot-plugin is determined. The first state cause the processing means 106 to select the first mode of operation. The first mode of operation involves a linear control of the gate voltage of the FET Q403. This linear control is illustrated in d) during a first time interval 501. Since, the capacitor C403 is discharged a current $i_{SNS}$ starts to flow, charging the capacitor C403. The current $i_{SNS}$ increases with the gate voltage $V_{GS}$ until a current threshold $i_{SNSMMAX}$ is reached, when this threshold is reached the linear increase of the gate voltage is interrupted and the gate voltage is adjusted to keep the current below the current threshold $i_{SNSMAX}$. Then, the gate voltage is again increased until a maximum gate voltage $V_{GSMAX}$ is reached.

t=t1: At this point of time the gate voltage has reached its maximum value $V_{GSMAX}$, and the capacitor C403 becomes more and more charged. After a period of time the capacitor is fully charged and the current $i_{SNS}$ rapidly decreases, and the voltage over the capacitor $V_C$ reaches a constant value.

t=t2: A power line disturbance (PLD) occurs, illustrated as a pulse 500. This PLD can for example be caused by switching 'off' a large inductive power consumer in the neighborhood of the current control circuit. The processing means 106 determines that the current control circuit is in a second state different from the first state, and a second mode of operation is selected. This second mode of operation involves switching the FET Q403 'on' and 'off'.

t=t3: The PLD pulse 500 ends and the overvoltage at the input terminal 101 vanish. When the FET Q403 turns 'on' again the current $i_{SNS}$ does not reach the threshold current $i_{SNSMAX}$ and the FET Q403 remains in the 'on' state.

It is obvious that the embodiments discussed above provide an improved current control circuit, as well as a method therefore.

In one embodiment comprises the processing means 106 a microcontroller with a computer readable memory. The computer readable memory contains instructions for the method disclosed hereinabove.

In one embodiment comprises the processing means 106 a programmable circuit such as a field programmable gate array or the like.

In one embodiment comprises the switching means 104 a bipolar transistor.

The invention claimed is:

1. A current control circuit comprising:
an input terminal configured to be connected to a DC voltage bus;
an output terminal;
detection circuitry configured to detect a parameter of the current control circuit;
switching circuitry connected to the input terminal via current detection circuitry and further connected to the output terminal via an output circuit, wherein the switching circuitry is configured to provide a controllable resistance;
processing circuitry connected to the current detection circuitry and further connected to the detection circuitry, wherein the processing circuitry is configured to:
receive a first signal indicative of a current flowing from the input terminal to the output terminal,
determine whether the current control circuit is in a first state indicative of a hot plug-in of the input terminal to the connectable DC voltage bus, wherein determining whether the current control circuit is in the first state comprises comparing a detected parameter of the switching circuitry to a predetermined threshold,
select between i) a first mode of operation of operation and ii) a second mode of in dependence on whether the current control circuit is determined to be in the first state indicative of the hot-plug-in of the input terminal to the connectable DC voltage bus such that the processing circuitry selects the first mode of operation as a result of determining that the current control circuit is in the first state and otherwise the processing circuitry selects the second mode of operation, and
control an output current using the selected mode of operation.

2. The current control circuit of claim 1, wherein
said detection circuitry comprises a voltage detector and the detected parameter of the current control circuit is an output voltage at the output terminal, and
determining whether the current control circuit is in the first state indicative of the hot plug-in of the input terminal to the connectable DC voltage bus comprises:
comparing the output voltage to a first predetermined threshold voltage, and
determining that the current control circuit is in the first state as a result of determining that the output voltage is below the first predetermined threshold voltage.

3. The current control circuit of claim 1, wherein
said detection circuitry comprises a voltage detector and the detected parameter of the current control circuit is an input voltage at the input terminal, and
determining whether the current control circuit is in the first state indicative of the hot plug-in of the input terminal to the connectable DC voltage bus comprises:
comparing the input voltage to a second predetermined threshold voltage, and
determining that the current control circuit is in the first state as a result of determining that the input voltage is below the second predetermined threshold voltage.

4. The current control circuit of claim 1, wherein
said detection circuitry comprises a temperature detector configured to detect a temperature of the switching circuitry, the detected parameter of the switching circuitry is the detected temperature, and the predetermined threshold is a first predetermined threshold temperature, and
determining whether the current control circuit is in the first state indicative of the hot plug-in of the input terminal to the connectable DC voltage bus comprises:
determining that the current control circuit is in the first state as a result of determining that the detected temperature is below the first predetermined threshold temperature.

5. The current control circuit of claim 1, wherein said detection circuitry comprises a timer configured to detect a lapsed time from a start of the current control circuit and the detected parameter of the current control circuit is the lapsed time, and
determining whether the current control circuit is in the first state indicative of the hot plug-in of the input terminal to the connectable DC voltage bus comprises:
comparing the detected lapsed time to a first predetermined time, and
determining that the current control circuit is in the first state as a result of determining that the detected lapsed time is shorter than the first predetermined time.

6. The current control circuit of claim 1, wherein the first mode of operation comprises linear control of the switching circuitry.

7. The current control circuit of claim 1, wherein the second mode of operation comprises switch mode control of the switching circuitry.

8. The current control circuit of claim 1, wherein the second mode of operation comprises controlling the switching circuitry of using a waveform from a group of piece-wise linear, saw-tooth, sinusoidal or spline.

9. The current control circuit of claim 1, wherein the switching circuitry comprises a transistor.

10. The current control circuit of claim 1, wherein the current detection circuitry comprises a resistor and the processing circuitry comprises a voltage detector configured to measure a voltage across said resistor.

11. The current control circuit of claim 1, wherein the output circuit comprises an inductor arranged in series with the output terminal, and a diode connected from an input of the output circuit to ground.

12. A method for a current control circuit comprising:
receiving a first signal indicative of a current flowing from an input terminal to an output terminal, the input terminal configured to be connected to a DC voltage bus;
determining a state of the current control circuit;
selecting a mode of operation based on said determined state of the current control circuit; and
controlling an output current using the selected mode of operation, wherein
selecting the mode of operation based on said determined state of the current control circuit comprises:
determining whether the determined state is a first state indicative of a hot plug-in of the input terminal to the connectable DC voltage bus, wherein determining whether the current control circuit is in the first state comprises comparing a detected parameter of switching circuitry to a predetermined threshold, the switching circuitry connected to the input terminal via current detection circuitry and further connected to the output terminal via an output circuit and configured to provide a controllable resistance; and
selecting between i) a first mode of operation and ii) a second mode of operation in dependence on whether the determined state is the first state indicative of the hot plug-in of the input terminal to the connectable DC voltage bus such that the first mode of operation is selected as a result of determining that the determined state is the first state and otherwise the second mode is selected.

13. The method of claim 12, wherein said determining the state involves measuring an output voltage at the output terminal and the detected parameter of the current control circuit is the measured output voltage, and determining whether the current control circuit is in the first state comprises:
comparing the output voltage to a first predetermined threshold voltage, and
determining that the current control circuit is in the first state as a result of determining that the output voltage is below the first predetermined threshold voltage.

14. The method of claim 12, wherein said determining the state involves measuring an input voltage at the input terminal and the detected parameter of the current control circuit is the measured input voltage, and determining whether the current control circuit is in the first state comprises:
comparing the input voltage to a second predetermined threshold voltage, and
determining that the current control circuit is in the first state as a result of determining that the input voltage is below the second predetermined threshold voltage.

15. The method of claim 12, wherein said determining the state involves measuring a temperature of the switching circuitry, the detected parameter of the current control circuit is the measured temperature, and the predetermined threshold is a first predetermined threshold temperature, and determining whether the current control circuit is in the first state comprises:
determining that the current control circuit is in the first state as a result of determining that the measured temperature is below the first predetermined threshold temperature.

16. The method of claim 12, wherein said determining the state involves measuring a lapsed time from starting the current control circuit and the detected parameter of the current control circuit is the lapsed time, and determining whether the current control circuit is in the first state comprises:
comparing the detected lapsed time to a first predetermined time, and
determining that the current control circuit is in the first state as a result of determining that the measured lapsed time is shorter than a first predetermined time.

17. The method of claim 12, wherein the first mode of operation comprises a linear control of the output current using the switching circuitry.

18. The method of claim 12, wherein the second mode of operation comprises switch mode control of the output current using the switching circuitry.

19. A control circuit, comprising:
an input terminal configured to be connected to a DC voltage bus;
an output terminal; and
a processor, wherein the processor is configured to:
receive a first signal indicative of a current flowing from the input terminal to the output terminal,
determine whether the control circuit is in a first state indicative of a hot plug-in of the input terminal to the connectable DC voltage bus, wherein determining whether the control circuit is in the first state comprises comparing a detected parameter of switching circuitry to a predetermined threshold, the switching circuitry connected to the input terminal via current detection circuitry and further connected to the output terminal via an output circuit and configured to provide a controllable resistance,
select between i) a first mode of operation and ii) a second mode of operation in dependence on whether the control circuit is determined to be in the first state indicative of the hot plug-in of the input terminal to the connectable DC voltage bus such that the processor selects the first mode of operation as a result of determining that the control circuit is in the first state and otherwise the processor selects the second mode of operation, and
control an output current using the selected mode of operation.

20. The method of claim 19, wherein
the processor is configured to control the output current using the first mode of operation by changing the output current at a first speed, and
the processor is configured to control the output current using the second mode of operation by changing the output current at a second speed,
wherein the first speed is slower than the second speed.

* * * * *